(12) United States Patent
Hettich

(10) Patent No.: US 11,306,496 B2
(45) Date of Patent: Apr. 19, 2022

(54) METHOD FOR ATTACHING MOUNTED PARTS TO CONCRETE OR MASONRY

(71) Applicant: Ludwig Hettich Holding GmbH & Co. KG, Schramberg (DE)

(72) Inventor: Ulrich Hettich, Schramberg (DE)

(73) Assignee: LUDWIG HETTICH HOLDING GMBH & CO. KG, Schramberg (DE)

( * ) Notice: Subject to any disclaimer, the term of this patent is extended or adjusted under 35 U.S.C. 154(b) by 88 days.

(21) Appl. No.: 16/472,080

(22) PCT Filed: Dec. 21, 2017

(86) PCT No.: PCT/EP2017/084239
§ 371 (c)(1),
(2) Date: Mar. 18, 2020

(87) PCT Pub. No.: WO2018/115364
PCT Pub. Date: Jun. 28, 2018

(65) Prior Publication Data
US 2020/0224439 A1    Jul. 16, 2020

(30) Foreign Application Priority Data
Dec. 21, 2016  (DE) .......................... 102016125201.8

(51) Int. Cl.
*E04B 1/41*        (2006.01)
*E04G 23/02*       (2006.01)
(Continued)

(52) U.S. Cl.
CPC ............ *E04G 23/0218* (2013.01); *E04B 1/41* (2013.01); *E04G 21/185* (2013.01);
(Continued)

(58) Field of Classification Search
CPC .............. E04G 23/0218; E04G 21/185; E04G 2023/0262; E04B 1/41; F16B 25/0026;
(Continued)

(56) References Cited

U.S. PATENT DOCUMENTS

2016/0108948 A1    4/2016  Hettich

FOREIGN PATENT DOCUMENTS

| CH | 173307 A | 11/1934 |
| CH | 279221 A | 11/1951 |

(Continued)

OTHER PUBLICATIONS

International Official Action dated Jun. 13, 2019 in relation to corresponding European Patent Application No. 17825857.0.
(Continued)

*Primary Examiner* — Patrick J Maestri
(74) *Attorney, Agent, or Firm* — Steve J. Grossman; Grossman, Tucker, Perreault & Pfleger PLLC

(57) ABSTRACT

A method is defined for attaching mounted parts on a mounting substrate formed of concrete or masonry, having a group of anchors wherein the following is true for the ratio VSd/NSd of the rated value for the transverse load VSd and of the rated value of the tensile load NSd of at least one anchor in the anchor group: VSd/NSd≥0.3, preferably VSd/NSd≥0.6 and particularly preferably VSd/NSd≥1.0, and wherein the characteristic resistances of these anchors to transverse loading VRk or to tensile loading NRk satisfy the following relationship: VRk/NRk≤1.1. The at least one anchor of the anchor group is inclined at an angle αAnker to the perpendicular to the surface of the mounting substrate in such a manner that the following is true: αAnker=k*¾*arc tan (VSd/NSd) for NSd>0, and αAnker=k*67.5° for NSd=0, where: 0.8≤k≤1.34, providing that αAnker≤75°.

28 Claims, 7 Drawing Sheets

(51) Int. Cl.
*F16B 25/00* (2006.01)
*E04G 21/18* (2006.01)
*E04H 9/02* (2006.01)
*F16B 5/06* (2006.01)
*F16B 37/12* (2006.01)

(52) U.S. Cl.
CPC .. *F16B 25/0026* (2013.01); *E04G 2023/0262* (2013.01); *E04H 9/021* (2013.01); *F16B 5/0642* (2013.01); *F16B 37/127* (2013.01)

(58) Field of Classification Search
CPC ...... F16B 5/0642; F16B 37/127; E04H 9/021; E04C 5/10; E21D 21/0033
See application file for complete search history.

(56) References Cited

FOREIGN PATENT DOCUMENTS

| | | |
|---|---|---|
| CN | 2632374 Y | 7/2003 |
| CN | 2632374 Y | 8/2004 |
| CN | 202612315 U | 12/2012 |
| DE | 2834200 A1 | 2/1980 |
| DE | 19830682 A1 | 2/2000 |
| DE | 102204033472 A1 | 1/2006 |
| DE | 202007007550 U1 | 9/2007 |
| DE | 102010014318 A1 | 10/2011 |
| DE | 102015213869 A1 | 1/2017 |
| EP | 1072802 A1 | 1/2001 |
| EP | 2816171 A2 | 12/2014 |
| FR | 2520455 A1 | 7/1983 |
| GB | 1111587 A1 | 5/1968 |
| GB | 2148969 A | 6/1985 |
| WO | 2014044677 A1 | 3/2014 |

OTHER PUBLICATIONS

HILTI—Technisches Handbuch der Befestigungstechnik fur Hoch- und Ingenieurbau (Jan. 2014)—Auszug, insb. Seiten 85-92.
International Search Report regarding corresponding application PCT/EP2017/084239 dated Jul. 17, 2018.
International Search Report relating to corresponding application PCT/EP2017/084230 dated Jul. 17, 2018.
The State Intellectual Property Office of Peoples Republic of China, Office Action related to corresponding Chinese Application No. 100098 dated Aug. 25, 2020.
International Search Report relating to Application No. PCT/EP2017/084239, dated Apr. 4, 2018 (English Translation attached).

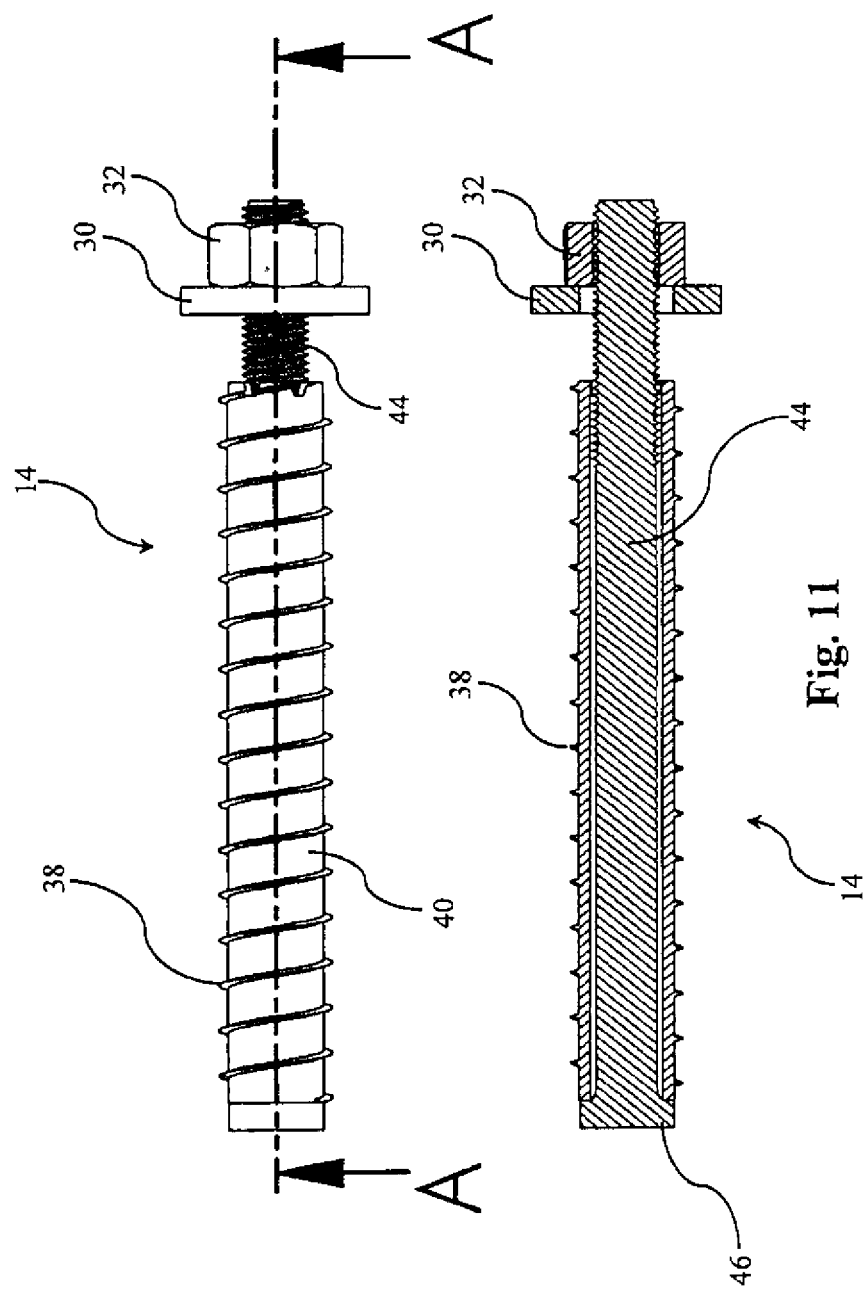

METHOD FOR ATTACHING MOUNTED PARTS TO CONCRETE OR MASONRY

FIELD OF THE INVENTION

The present invention relates to a method for attaching mounted parts to a mounting substrate, which is formed of concrete or masonry. It further relates to a corresponding computer program for rating such mounting attachments.

BACKGROUND AND RELATED PRIOR ART

It is known in the prior art to attach mounted parts of different materials to a mounting substrate of concrete or masonry. Secondarily (i.e. subsequently) introduced anchorages are thereby always arranged normal to the component surface in the prior art. This manifest itself in particular by means of the international regulations for anchoring systems in concrete, which currently apply for structural engineering, all of which are to be anchored normal to the concrete surface according to the regulations.

The characteristic resistances of the anchor for the different failure mechanisms under tensile and transverse loads are the basis for the rating of anchorages in the concrete. The most relevant failure mechanisms with regard to tensile load are steel failure, concrete pryout failure and failure caused by pull-out. The most important failure mechanisms under transverse load are also steel failure, a concrete pryout failure on the side facing away from the load, and a concrete edge breakage. If transverse forces with a lever arm occur, proof of bending shall also be provided, which in turn influences the characteristic resistance of the anchor to steel failure and, depending on the length of the lever arm, may significantly reduce it.

The following rating rules need to be followed on principle:

quotient of tensile load impact and resistance:
$N_{Sd}/N_{Rd} \leq 1$, and
quotient of transverse load impact and resistance:
$V_{Sd}/V_{Rd} \leq 1$,
interaction condition:
$N_{Sd}/N_{Rd} + V_{Sd}/V_{Rd} \leq 1.2$,
and bending verification:
$M_{Sd}/M_{Rd} + N_{Sd}/N_{Rd} \leq 1$,
wherein:
 $N_{Sd}$=rated value of the tensile load
 $V_{Sd}$=rated value of the transverse load
 $M_{Sd}$=rated value of the bending load
 $N_{Rd}$=rated value of the resistance under tensile load
 $V_{Rd}$=rated value of the resistance under transverse load
 $M_{Rd}$=rated value of the resistance under bending load.

For a detailed description of the rating verifications, reference is made to the GUIDELINE FOR EUROPEAN TECHNICAL APPROVAL of METAL ANCHORS FOR USE IN CONCRETE (ETAG 001, Appendix C 1997).

In consideration of these rating regulations, the person skilled in the art can determine, based on specified rated values with regard to tensile load, transverse load, and bending load, whether a planned attachment of mounted parts to concrete or masonry is possible with the aid of a group of anchors, which is identified below as a "mounting group", i.e. satisfies the rating rules or regulations. For this purpose, the person skilled in the art typically uses a computer program, into which information is input interactively, which is representative for the tensile load, the transverse load, and possibly a bending load, and which automatically calculates Whether the planned attachment with the planned anchors satisfies the rating rules or regulations. Conventional computer programs typically further specify to what extent the rules are satisfied. It could turn out, for example, that the rating rules or regulations are significantly over-obeyed; in this case, the person skilled in the art can change the design, for example can use fewer anchors, or can use more cost-efficient anchors with a smaller cross section, and can verify the rating once again. Vice versa, the computer program can display that a planned attachment does not satisfy the rating rules/regulations. In this case, the person skilled in the art can provide additional anchors and/or can use anchors comprising a larger diameter, and can verify the changed design once again.

The result is not satisfactory in all cases. It may be difficult, for example, to select suitable anchors for areas close to an edge of the mounting substrate. Specifically in areas close to the edge, the use of anchors with a larger diameter, regardless of the higher costs, is often impossible, because this may entail problems with regard to concrete edge breakage. When rating the characteristic resistance with regard to transverse load, concrete edge breakage needs to be considered, as a general rule, when the distance of the anchor from the edge falls below 60 times the diameter of the anchor. It thus goes without saying that it would often be particularly advantageous to manage with an anchor of a smaller diameter. There is thus a need for improved methods for attaching mounted parts to masonry or concrete.

SUMMARY OF THE INVENTION

The object underlying the present invention is to provide an improved method for attaching mounted parts to masonry or concrete. This problem is solved by means of the method according to claim 1 and a corresponding computer program according to claim 16, and a rating method according to claim 20. Advantageous developments are specified in the dependent claims.

The invention provides a method for attaching mounted parts using a group of anchors to a mounting substrate, which is formed of concrete or masonry.

The method is used for cases, in which for the ratio $V_{Sd}/N_{Sd}$ of the rated value for the transverse load $V_{Sd}$ and the rated value of the tensile load $N_{Sd}$ of at least one anchor of the anchor group the following applies: $V_{Sd}/N_{Sd} \geq 0.3$, preferably $V_{Sd}/N_{Sd} \geq 0.6$, and particularly preferably $V_{Sd}/N_{Sd} \geq 1.0$, and wherein the characteristic resistances of this anchor to transverse loading $V_{Rk}$ or to tensile loading $N_{Rk}$, respectively, satisfy the following relationship:

$$V_{Rk}/N_{Rk} \leq 1.1.$$

The characteristic resistances $V_{Rk}$, $N_{Rk}$, thereby each identify the smallest characteristic resistance, which follows from the different failure types, which are to be considered for the rating, thus for example $V_{Rk,s}$, $N_{Rk,s}$, in the case of steel failure, in particular in consideration of a lever arm, which may be present, $V_{Rk,e}$, $N_{Rk,e}$ in the case of the concrete pryout failure (concrete pryout failure under tensile load, concrete pryout failure on the side facing away from the load or concrete edge breakage under transverse load), etc.

According to the invention, the at least one anchor of the mounting group is inclined at an angle $\alpha_{anchor}$ to the normal to the surface of the mounting substrate in such a manner that the following applies:

$$\alpha_{anchor} = k*\tfrac{3}{4}*\arctan(V_{Sd}/N_{Sd}) \text{ for } N_{Sd} > 0, \text{ and}$$

$$\alpha_{anchor} = k*67.5° \text{ for } N_{Sd} = 0,$$

where: $0.6 \leq k \leq 1.34$, preferably $0.8 \leq 1.34$, provided that $\alpha_{anchor} \leq 75°$, wherein $\alpha_{anchor}$ is the angle of inclination of the anchor with respect to the normal to the surface of the mounting substrate. Here the angle of inclination $\alpha_{anchor}$ is to be measured in the plane in which the transverse load $V_{Sd}$ underlying the rating lies. Within this plane, the orientation of the angle $\alpha_{anchor}$ is to be selected in such a manner that the angle between the longitudinal axis of the anchor and the resultant load becomes smaller than in the case of normal mounting. This means that a head of the anchor, as compared with the normal mounting position, is tilted in the direction of the transverse load $V_{Sd}$.

According to the invention, the anchors used as part of the attachment of a mounted part to concrete or masonry, are thus at least partially positioned at an angle $\alpha_{anchor}$ to the surface of the mounting substrate, which does not equal 90°. This contradicts common practice, according to which anchors in concrete are generally to be positioned normal to the concrete surface. Here the angle $\alpha_{anchor}$ is selected according to the rule: $\alpha_{anchor} = k*\frac{3}{4}*\arctan(V_{Sd}/N_{Sd})$. For the case $N_{Sd}=0$, i.e. the case of pure transverse load, the following applies: $\alpha_{anchor} = k*67.5°$. The parameter k can be selected at an interval of between 0.8 and 1.34.

The invention is based on the understanding that for a certain class of application, an inclined anchor allows better load-bearing capacity than an anchor positioned normal to the surface of the base in accordance with the prior art. Very good load-bearing capacities can be achieved when the angle $\alpha_{anchor}$ is 75% of the angle, at which the resultant of tensile load and transverse load is to the normal to the surface of the mounting substrate, and which can be calculated by $\arctan(V_{Sd}/N_{Sd})$. This corresponds to the case in which the parameter k takes the value 1. The range $0.8 \leq k \leq 1.34$ defines a corridor around this preferred selection of the angle, which also promises good load-bearing capacities. Within this range, the value of the parameter k is to always be selected in such a manner, however, that $\alpha_{anchor} \leq 75°$. The parameter k is preferably to be selected in such a manner that $\alpha_{anchor} \leq 70°$.

Fundamentally, it is steel failure that limits the load level of the anchor. With regard to the resistance under tensile loading, the characteristic resistance $N_{Rk,s}$ of the anchor represents an upper limit in the case of steel failure, which cannot be exceeded, regardless of the nature of the mounting substrate, the arrangement in the mounting substrate, etc. The value $N_{Rk,s}$ follows from the equation $$N_{Rk,s}=A_S*\text{fuk},$$

where $A_S$ is the cross-sectional surface of the anchor and fuk is the characteristic tensile strength of the steel. Even though steel is always assumed to be the material of the anchor in the present disclosure, it goes without saying that the invention is not limited to anchors made of steel.

The actual resistance under tensile loading, however, can be decreased due to failure mechanisms other than steel failure. Other possible failure mechanisms are, for example, concrete payout failure and failure as a result of pull-out. For further details, reference is made to the GUIDELINE FOR EUROPEAN TECHNICAL APPROVAL of METAL ANCHORS FOR USE IN CONCRETE (ETAG 001, Appendix C, issue 1997), which is incorporated into the present disclosure by reference.

The characteristic resistance under tensile loading $N_{Rk}$, which is relevant for the rating, is the smallest resistance that can result from the different failure mechanisms that are to be considered for the rating.

With regard to the resistance under transverse loading, $V_{Rk}$, in turn, the characteristic resistance with regard to steel failure without a lever arm, represents the upper limit. If no lever arm is present, it can be assumed that with regard to pure steel failure, the transverse load-bearing capacity can be a maximum of 0.5 times the tensile load-bearing capacity of the anchor, so that the following applies $$V_{Rk,s}=0.5*N_{Rk,s}=0.5*A_S*\text{fuk},$$

If the transverse load, however, is applied via a lever arm, a "characteristic resistance under bending loading" has to be considered. More detailed information with regard to this and to the corresponding formulae relating to the calculation can be found, in turn, in the above-quoted approval guidelines ETAG 001. The failure mechanism in this case is still a steel failure, so that the resistance can still be identified as $V_{Rk,s}$, but it is typically significantly smaller than the maximum value $0.5*A_S*\text{fuk}$ in this case.

In addition to the steel failure with and without a lever arm, there are also further failure mechanisms in the case of transverse loading, in particular concrete pryout failure on the side facing away from the load (the so-called pryout failure), and concrete edge breakage, which is typically to be considered when the anchor is located at a distance from the edge of the mounting substrate of less than ten times its installation depth, or less than 60 times its diameter. There is, in turn, a characteristic resistance for each of these failure mechanisms, and the smallest resistance forms the characteristic resistance $V_{Rk}$, which is relevant here, under transverse loading.

The inventor has systematically analyzed various failure mechanisms of anchors in concrete for the case in which, deviating from common practice, the anchors are not introduced normal to the surface of the mounting substrate, but are inclined at an angle $\alpha_{anchor}$ with respect to the surface normal of the mounting substrate.

In practice, installation situations often exist in which either a transverse load is applied to anchor groups close to the edge, such as, e.g. when attaching balcony railings and parapets, or in which bending loadings need to be considered. The unsatisfactory results that emerge again and again in cases of rating services for customers, were a reason to think about whether anchor groups can be better utilized. After in-depth analysis of the classification of the rating according to ETAG_001, it was found that an improvement of the utilization of an anchor group via an improved utilization of the tensile load-bearing capacity can be achieved. To achieve this, it was envisaged that the anchor should not be positioned normal to the surface of the mounting substrate, but more toward the direction of the resultant load formed by the tensile and transverse load components, which is to be transferred by the individual anchor.

By way of a comparison of the conical surfaces of the pryout body of an anchor, which is installed at an inclined angle, comprising the same anchoring depth measured normal to the surface, with respect to the conical surface of an anchor, which is positioned normally, it can be shown that the surface of the inclined anchor is at least identical, except for a small angular range, but with increasing angles always larger than the conical pryout surface of the anchor, which is installed normally. Even the limitation of the surface by a concrete edge does not lead to smaller surfaces. This analogy reinforces the assumption that an anchor, which is installed at an inclined angle, can attain the same tensile load-bearing capacity, as a normally installed anchor. An improved utilization of the anchors has been confirmed with component tests, which were executed on this basis, and with FEM simulations.

The inventor has determined that there is a broad class of applications, in which the load-bearing capacity, as compared to the load-hearing capacity in the case of normal mounting of an anchor, can be improved, sometimes even improved significantly, when the angle $\alpha_{anchor}$ is selected according to the invention, i.e. when the following applies: $\alpha_{anchor}=k*\frac{3}{4}*\arctan(V_{Sd}/N_{Sd})$, where $0.8 \leq k \leq 1.34$. In concrete terms, significant improvements in the load-bearing capacity have been determined for applications, in which the following applies: $V_{Rk}/N_{Rk} \leq 1.1$, wherein the characteristic resistance under transverse loading $V_{Rk}$ is thus smaller or only insignificantly larger than the characteristic resistance $N_{Rk}$ under tensile loading. The smaller the ratio $V_{Rk}/N_{Rk}$ becomes, the larger the improvement as compared to conventional normal mounting. Improvements can specifically be achieved routinely as compared to normal mounting, when the anchoring depth hef, which is measured normal to the surface, is kept constant, which means that the anchor has to be selected to be longer by a factor $1/\cos(\alpha_{anchor})$, than in the case of normal mounting. This poses virtually no problems, however, because a slightly longer anchor increases costs to a negligible extent. In contrast, it is much more problematic when anchors, which comprise a larger diameter and which are not only markedly more expensive, but which can often not be used specifically in edge areas, in which rating problems occur, because they lead to an increased risk of a concrete edge breakage (which ultimately leads to a smaller value for $V_{Rk}$), have to be selected in order to maintain the rating.

However, the method only relates to cases in which the rated value for the transverse load accounts for a "significant proportion of the total load", and in particular to cases, in which the following applies: $V_{Sd}/N_{Sd} \geq 0.3$. For smaller proportional transverse loads, the increase in load-bearing capacity is not available, or is not sufficiently significant to justify the additional effort of an inclined mounting. Although the parameter k can in principle be selected within the defined range, an additional condition should be that k shall always be selected to be sufficiently small, so that the following applies: $\alpha_{anchor} \leq 75°$, preferably $\leq 70°$, so as not to make the mounting overly difficult.

A number of typical situations exist, in which the ratio $V_{Rk}/N_{Rk}$ becomes small, and specifically becomes $\leq 1.1$, and wherein the method of the invention is used in an advantageous manner.

In one typical application attachments are close to an edge, wherein the characteristic resistances of the transverse load are mostly significantly smaller than the characteristic resistances for tensile load, that is to say, $V_{Rk} < N_{Rk}$.

In a further typical application there are attachments without edge impact with large placement depths, wherein pure steel failure governs the rating limit, and where $V_{Rk,s} = 0.5*N_{Rk,2}$ to a close approximation, so that $V_{Rk} < N_{Rk}$, in any case.

A bending load can also strongly reduce the load-bearing capacity. As cited above, a bending load with a lever arm leads to a decreased value for $V_{Rk}$, and thus usually also to a situation where $V_{Rk} < N_{Rk}$.

Bending loads on the anchor have to be considered when an intermediate layer, which is not pressure-resistant, is present between the mounted part and the mounting substrate, or when a gap or distance is present between the mounted part and the mounting substrate. Bending loads must further be considered, when the mounted part itself is not pressure-resistant, that is to say, for example, does not consist of metal or concrete, but, e.g., of wood. Finally, bending loads usually play a role, when the hole clearance of the connection is too large. As the distance between the load introduction into the anchor in the mounted part and the parting line between the mounted part and the mounting substrate increases, the bending load increases while the effect on the mounted part remains the same.

Due to the inclined installation, to put it simply, the anchor is subjected to a higher tensile load than a normally installed anchor under the same load situation. As an extreme case with k=1.33, the method according to the invention envisages the situation in which the anchor assumes the same inclined angle to the surface of the mounting substrate, as the total load, i.e. the resultant of transverse load and tensile load. In this case, the anchor would only receive a tensile load.

According to calculations by the inventor, the best results are generally not obtained, however, when the longitudinal axis of the anchor is aligned parallel to the resulting force, but when the angle $\alpha_{anchor}$ is selected to be smaller than the angle of the resultant load with respect to the normal to the surface of the mounting substrate. In preferred embodiments, k is thus $\leq 1.2$, preferably $k \leq 1.15$, and particularly preferably $k \leq 1.1$. For the most part, this is the case when pressure can also be transferred via the parting line between the mounted part and the mounting substrate. In mounting positions where $k \leq 1.2$, the anchor load is predominantly tensile (with respect to the axis of the anchor, not with respect to the surface normal to the mounting substrate), but also comprises a small transverse component. The transverse load, however, is directly absorbed by the anchor being pressed against the borehole wall in the mounted part. Due to the redistribution of the reaction forces, the mounted part is thus pressed onto the mounting substrate. In preferred embodiments, the following thus applies: $k \leq 1.2$, preferably $k \leq 1.15$, and particularly preferably $k \leq 1.1$. In an advantageous embodiment, the at least one anchor is guided through a bore in the mounted part, wherein the diameter of the bore in a section, in which it is accommodated in the bore in the mounted state, exceeds the diameter of the anchor by less than 22%, preferably less than 12%. In the case of such a small clearance of the anchor in the bore of the mounted part, the transverse load can be absorbed effectively via compression.

The assessment is different for the case, in which a space is present between the mounted part and the mounting substrate, in which a material is located, which is not pressure-resistant. One example of a material that is not pressure-resistant, could be, for example, a non-pressure resistant plaster layer, which is not pressure-resistant, wood, an insulating layer or also simply air. The parameter k is preferably selected to be larger in this case, so that the following applies: $k \geq 1.1$, preferably $k \geq 1.2$, and particularly preferably $k \geq 1.25$. The ideal case can be the selection of k=1.33, according to which the anchor is aligned parallel to the direction of the total load, so that the anchor is only subjected to tension (in relation to its own axis, not to the surface of the mounting substrate!).

Even though the above-described relationship defines specific angles of inclination $\alpha_{anchor}$, which promise a particularly marked increase of the load-bearing capacity, it is not necessary in practice to calculate the matching angle individually and specifically for each application. Instead significant progress as compared to the common method can be achieved if, as an alternatively to normal mounting, only one possible alternative standard mounting angle $\alpha_{anchor}$ is considered, which thus represents an alternative to the single currently valid mounting angle of 0°. According to analyses by the inventor, this alternative standard mounting angle $\alpha_{anchor}$ should be between 35° and 55°, preferably between 40° and 50°, and particularly preferably at approximately 45° to the normal to the surface of the mounting substrate, because a significant improvement can thereby be achieved in a large number of applications. In this simplified embodiment of the method, the alternative standard mounting angle is considered at least when for the ratio $V_{Sd}/N_{Sd}$ of the rated value of the transverse load $V_{Sd}$ and of the rated value of the tensile load $N_{Sd}$ for at least one anchor in the anchor group the following applies: $V_{Sd}/N_{Sd} \geq 0.8$ and preferably $V_{Sd}/N_{Sd} \geq 1.0$, and when the characteristic resistances for this anchor to transverse loading $V_{Rk}$ and or to tensile loading $N_{Rk}$, respectively, satisfy the following relationship: $V_{Rk}/N_{Rk} \leq 1.1$. As a result of the limitation to this one alternative standard mounting angle, the method is significantly simplified with regard to the mounting as well as with regard to the rating. The load-bearing capacity can at the same time already be increased significantly in many cases with this alternative standard mounting angle.

The inventor has executed pull-out tests specifically for a mounting angle of 45° and has determined that significant improvements can be achieved with this, both for the case of a resultant load at this 45° angle (i.e. $V_{Sd}=N_{Sd}$), and for the case of a pure transverse force ($N_{Sd}=0$). Specifically in the case of a mounting close to the edge, it was possible to increase the resistance with regard to the case of a pure transverse force by a factor of three, as compared to a normally mounted anchor comprising the same effective anchoring depth hef, i.e. measured normal to the surface of the mounting substrate. For a force that is also at a 45° angle to the surface normal (i.e. $V_{Sd}=N_{Sd}$), it was even possible to increase the failure load by a factor of four. Here it is remarkable that the tensile strength normal to the concrete surface again with the same effective anchoring depth was comparable to that of the normal mounting. To attain the same effective anchoring depth hef, the anchor, which is positioned at an angle of 45°, has to be longer by a factor of 1.41 than the normally positioned anchor. The significant increases in load-bearing capacity, however, are in no way just a result of the greater anchor length. Instead, the pulling experiments show that a mounting at an angle of 45° to the surface normal generally leads to significant improvements with regard to load-bearing capacity even with the same length of anchor, as long as the transverse load $V_{Sd}$ is similar to or greater than the tensile load $N_{Sd}$, which is to be attributed to the anchor.

In the context of the simplified method, tests could routinely be executed as to whether the load-bearing capacities increase and possibly by how much, if it is to be assumed that the inclined mounting with the alternative standard mounting angle could entail an improvement as compared to the normal mounting, in order to make a decision as to whether this alternative standard mounting angle is to be utilized. This alternative standard mounting angle would automatically be considered as well in advantageous embodiments and would be proposed to the user.

In preferred embodiments, the characteristic resistances to transverse loading $V_{Rk}$ or to tensile loading $N_{Rk}$, respectively, satisfy the following relationship: $V_{Rk}/N_{Rk} \leq 1.0$, preferably $\leq 0.8$, and particularly preferably $\leq 0.6$.

In the case of anchor groups, that is, mounted parts, which are attached by means of several anchors, the load transmission can also be distributed to the effect that some of the anchors are inclined according to the invention, while the others are arranged normally. By means of suitable selection of the size of the through bores in the mounted part, the tensile load can thereby be assigned to the normally arranged anchors, and the transverse load to the anchors that are arranged at an inclined angle. In the case of anchor groups, a further optimization of the connection can thereby be achieved.

The said anchor, which is positioned at the above-defined angle $\alpha_{anchor}$, can, for example, be an anchor within the anchor group, which is closer to the edge, and the anchor group can include an anchor further away from the edge, which is positioned normal to the surface of the mounting substrate. The idea behind this is that, according to the valid rating regulations, an anchor close to the edge has to be able to support the complete transverse load, and the characteristic resistance to transverse loading $V_{Rk}$ in areas close to the edge is smaller than in areas at a distance from the edge. Due to the fact that the anchor, which is inclined at the angle $\alpha_{anchor}$, applies a significantly larger resistance against transverse loads, this criterion can be satisfied more easily as part of the invention than in the prior art. The demands on the characteristic resistance to transverse loading $V_{Rk}$ on the anchor at a distance from the edge, however, are lower, so that the said anchor can be positioned normally, as usual. An anchor is identified as "close to the edge" in the present disclosure, if it is located at a distance of less than ten times the effective, i.e. normal anchoring depth hef, preferably by less than five times the effective manufacturing depth, away from the edge of the mounting substrate.

In an advantageous development, the said anchor, which is positioned at the above-defined angle $\alpha_{anchor}$, is an anchor within the anchor group that is further from the edge, and the anchor group includes an anchor, which is closer to the edge and which is accommodated in an elongate hole in the mounted part and is positioned normal to the surface of the mounting substrate. As part of the present disclosure, an "elongate hole" is understood to be a hole, which is dimensioned sufficiently large that it can be assumed that an anchor, which is accommodated there is not subjected to a significant transverse load. This can be an elongate hole in in the stricter sense of an oblong hole, but can also be a round hole with a sufficiently large diameter. In this embodiment, the anchor close to the edge is thus positioned normally, and is thus less able to withstand transverse loads. Due to the fact that this anchor close to the edge is accommodated in an elongate hole, however, it is only subjected to tensile forces, but not transverse forces, and the latter thus do not need to be considered in the rating. Accordingly, the anchor further away from the edge has to withstand higher transverse forces. However, the inclined mounting is particularly advantageous for this purpose.

The above-described method can be used for any anchors, of which some that are preferred will be cited briefly below. In the simplest case, the at least one anchor can be formed by a one-piece anchor, which comprises the following:
- a load introduction region, which is arranged in the region of a leading end of the anchor and which is suitable for introducing a load into the mounting substrate,
- a shaft section,
- a section or an element for securing the anchor to the mounted part in the region of a trailing end, and
- a power drive for positioning the anchor.

The one-piece anchor can be formed, for example, by a conventional concrete screw. In this case, the load introduction region will be formed by a concrete thread, the power drive will be formed by a screw head, and the section for securing the anchor to the mounted part will also be formed by the screw head. The one-piece anchor can also be formed, however, by an expansion anchor or an undercut anchor.

In other embodiments, the at least one anchor is formed by a two-piece system, which comprises an anchor sleeve and a clamping element, wherein the anchor sleeve is suitable for introducing a load into the mounting substrate and has an internal thread, and wherein the clamping element has a shaft section. Which, in the region of its leading end, has an external thread, by means of which it can be screwed into the internal thread of the anchor sleeve in order to transfer a load, comprises a section or an element for securing the shaft section of the clamping element to the mounted part in the region of a trailing end, and has a power drive for screwing the clamping element into the anchor sleeve.

Here the section for securing the anchor or the clamping element, respectively, to the mounted part can be formed by a screw head, which simultaneously forms the said power drive.

Alternatively, the at least one anchor is formed by a two-piece system, which comprises an anchor sleeve and a clamping element, wherein the anchor sleeve is suitable for introducing a load into the mounting substrate, and wherein the clamping element has a shaft section, which, in the region of its leading end, has a stop element, in particular a screw head or a screwed-on nut, against which the anchor sleeve can abut in order to transfer a load, and comprises a section or an element for securing the shaft section of the clamping element to the mounted part in the region of a trailing end.

The advantage of this embodiment is that the anchor sleeve does not need to be provided with an internal thread, which reduces the production costs.

A thread is preferably provided on the trailing end of the anchor or of the clamping element, respectively, and the said element for securing the anchor or the clamping element is formed by a nut, which can be screwed against the mounted part on the thread.

In an alternative embodiment, the anchor is formed by a multi-piece system, which comprises the following:

a first anchor sleeve, which is suitable for introducing a load into the mounting substrate, a second anchor sleeve, which is suitable for introducing a load into the mounted part, and an elongate clamping element, which is suitable for being guided through the second anchor sleeve and for being inserted into the first anchor sleeve, or for being guided through the latter, and which is suitable for axially clamping the first and the second anchor sleeve in such a manner that the first and the second anchor sleeve generate opposed bond stresses in the mounting substrate or mounted part, respectively.

Here the statement that the elongate clamping element is suitable "for being guided through" the two anchor sleeves is not to suggest that the anchor sleeves are necessarily inserted prior to the clamping element. It is in fact also possible in this embodiment that, in the region of its leading end, the clamping element has a stop element, in particular a screw head or a screwed-on nut, against which the anchor sleeve can abut in order to transfer a load. In this case, the elongate clamping element is first inserted into the borehole and the anchor sleeves are subsequently attached or "threaded" onto the clamping element, and are introduced into the borehole so as to slide across the clamping element, wherein the elongate clamping element, even though it is stationary, is "guided through" the anchor sleeves.

A further aspect of the invention relates to a computer program product comprising a plurality of instructions, which execute the following steps, when executed on a computer system: outputting a Graphical User Interface (GUI) via a display device, wherein the GUI has input fields, which allow a user to input information with regard to a planned attachment of a mounted part to a mounting substrate of concrete or masonry anchors using a group of anchors, wherein this information represents at least a rated value of the transverse load $V_{Sd}$ and a rated value of the tensile load $N_{Sd}$ of at least one anchor in the anchor group, or the said rated values $V_{Sd}$ and $N_{Sd}$ can be derived from this information, wherein the GUI is further configured to display whether the planned attachment corresponds to predetermined rating regulations, where at least in the cases in which for the ratio $V_{Sd}/N_{Sd}$ of the rated value of the transverse load $V_{Sd}$ and the rated value of the tensile load $N_{Sd}$ of an anchor in the anchor group the following applies: $V_{Sd}/N_{Sd} \geq 0.3$, preferably $V_{Sd}/N_{Sd} \geq 0.6$, and particularly preferably $V_{Sd}/N_{Sd} \geq 1.0$, and in which the characteristic resistances to transverse loading $V_{Rk}$ or to tensile loading $N_{Rk}$, respectively, of this anchor satisfy the following relationship: $N_{Rk}/V_{Rk} \leq 1.1$, the computer program is configured to execute a calculation of the rating of this anchor of the anchor group for mounting at an angle $\alpha_{anchor}$ to the normal to the surface of the mounting substrate, for which the following applies:

$$\alpha_{anchor}=k*\tfrac{3}{4}*\arctan(V_{Sd}/N_{Sd}) \text{ for } N_{Sd}>0, \text{ and}$$

$$\alpha_{anchor}=k*67.5° \text{ for } N_{Sd}=0, \text{ where}$$

where: $0.8 \leq k \leq 1.34$, provided that $\alpha_{anchor} \leq 75°$, wherein $\alpha_{anchor}$ is the angle of inclination of the anchor with respect to the normal to the surface of the mounting substrate, wherein the angle of inclination $\alpha_{anchor}$ is to be measured in the plane in which the transverse load $V_{Sd}$ lies, on which the rating is based, and to output the result of the rating.

Alternatively, a computer program product can be provided, which is directed to the above-identified simplified method, in which an alternative standard mounting angle is considered in addition to the usual mounting of the anchors at 0°. This computer program comprises a plurality of instructions, which execute the following steps, when executed on a computer system:

outputting a Graphical User Interface (GUI) via a display device, wherein the GUI has input fields, which allow a user to input information with regard to a planned attachment of a mounted part to a mounting substrate of concrete or masonry using a group of anchors, wherein this information represents at least one rated value of the transverse load $V_{Sd}$ and a rated value of the tensile load $N_{Sd}$ of at least one anchor in the anchor group, or these rated values $V_{Sd}$ and $N_{Sd}$ can be derived from this information, wherein the GUI is further configured to display whether the planned attachment corresponds to predetermined rating regulations, wherein the computer program is configured to execute a calculation of the rating of this anchor of the anchor group for mounting at an angle $\alpha_{anchor}$ to the normal to the surface of the mounting substrate, for which the following applies: $35° \leq \alpha_{anchor} \leq 55°$, preferably $40° \leq \alpha_{anchor} \leq 50°$, particularly preferably $43° \leq \alpha_{anchor} 48°$, wherein the angle of inclination $\alpha_{anchor}$ is to be measured in the plane in which the transverse load $V_{Sd}$ lies, on which the rating is based, and to output the result of the rating. In this simplified embodiment, the angle $\alpha_{anchor}$ is a predetermined angle, which does not need to be calculated individually as a function of the actual rated values of the transverse load. $V_{Sd}$ and of the tensile load $N_{Sd}$.

In an advantageous embodiment, the input fields of the GUI allow the user to input information with regard to one or a plurality of the following features: type or nature, respectively, of the mounting substrate; type, size, shape, material of an anchor plate, rated values with regard to tensile force, transverse force, torsional moment, and/or bending moment, type and/or dimension of the anchor.

In an advantageous development, the computer program product is configured to calculate initially a rating for an anchor, which is positioned normal to the mounting substrate, and, in the event that the said anchor does not satisfy the rating regulations/rules, to propose alternatively a suitable mounting, which does satisfy the rating regulations/rules.

A further aspect of the invention relates to a method for rating an attachment of mounted parts to a mounting substrate, which is formed of concrete or masonry, using a group of anchors, wherein for the ratio $V_{Sd}/N_{Sd}$ of the rated value of the transverse load $V_{Sd}$ and the rated value of the tensile load $N_{Sd}$ of at least one anchor in the anchor group the following applies: $V_{Sd}/N_{Sd} \geq 0.3$, preferably $V_{Sd}/N_{Sd} \geq 0.6$, and particularly preferably $V_{Sd}/N_{Sd} \geq 1.0$.
and wherein the characteristic resistances to transverse loading $V_{Rk}$ or to tensile loading $N_{Rk}$, respectively, for this anchor satisfy the following relationship: $V_{Rk}/N_{Rk} \leq 1.1$. Here it is verified for this anchor whether the rated value of the loading exceeds the rated value of the resistances of this anchor with respect to at least one failure mechanism, for the case that this anchor is positioned at an angle of inclination $\alpha_{anchor}$ to the normal to the surface of the mounting substrate in such a manner that the following applies:

$$\alpha_{anchor} = k \ast \frac{3}{4} \ast \arctan(V_{Sd}/N_{Sd}) \text{ for } N_{Sd} > 0, \text{ and}$$

$$\alpha_{anchor} = k \ast 67.5° \text{ for } N_{Sd} = 0,$$

where: $0.6 \leq k \leq 1.34$, preferably $0.8 \leq 1.34$, provided that $\alpha_{anchor} \leq 75°$, wherein the angle of inclination $\alpha_{anchor}$ is to be measured in the plane in which the transverse load $V_{Sd}$ underlying the rating lies.

In advantageous embodiments of this rating method, the following applies: $k \leq 1.2$, preferably $k \leq 1.15$, and particularly preferably $k \leq 1.1$. Additionally or alternatively, the following also applies: $k \geq 0.85$, preferably $k \geq 0.9$.

A further aspect relates to an alternative, simplified method for rating an attachment of mounted parts to a mounting substrate, which is formed of concrete or masonry, using a group of anchors, wherein for the ratio $V_{Sd}/N_{Sd}$ of the rated value of the transverse load $V_{Sd}$ and of the rated value of the tensile load $N_{Sd}$ of at least one anchor (14) in the anchor group the following applies: $V_{Sd}/N_{Sd} \geq 0.8$ and preferably $V_{Sd}/N_{Sd} \geq 1.0$, and wherein the characteristic resistances to transverse loading $V_{Rk}$ to tensile loading $N_{Rk}$ for this anchor satisfy the following relationship: $V_{Rk}/N_{Rk} \leq 1.1$. According to this simplified rating method, it is verified for this anchor, whether the rated value of the loading exceeds the rated value of the resistances of this anchor with respect to at least one failure mechanism, for the case that this anchor is positioned at an angle of inclination $\alpha_{anchor}$ of between 35° and 55°, preferably of between 40° and 50°, and particularly preferably of approximately 45° to the normal to the surface of the mounting substrate, wherein the angle of inclination anchor is to be measured in plane, in which the transverse load $V_{Sd}$ underlying the rating lies.

In preferred embodiments of these rating methods, the characteristic resistances to transverse loading $V_{Rk}$ or to tensile loading $N_{Rk}$, respectively, satisfy the following relationship:

$V_{Rk}/N_{Rk} \geq 1.0$, preferably $\leq 0.8$, and particularly preferably $\leq 0.6$.

In the mounting attachment to be rated, the at least one anchor is preferably guided through a bore in the mounted part, wherein the diameter of the bore exceeds the diameter of the anchor in a section, in which it is accommodated in the bore in the mounted state, by less than 22%, preferably by less than 12%.

In the mounting attachment to be rated, the said anchor is preferably an anchor within the anchor group that is closer to an edge, and the anchor group includes an anchor that is further away from the edge, which is positioned normal to the surface of the mounting substrate.

In the mounting attachment to be rated, the said anchor is preferably an anchor within the anchor group, which is further away from the edge, and the anchor group includes an anchor, which is closer to the edge, which is accommodated in an elongate hole in the mounted part and which is positioned normal to the surface of the mounting substrate. It is important to note that an anchor is in particular considered to be "close to the edge" in the present disclosure, when.

In the case of the mounting attachment to be rated, a space is preferably present between the mounted part and the mounting substrate, in which a material, which is not pressure-resistant, is located, and for which the following applies: $k \geq 1.1$, preferably $k \geq 1.2$, and particularly preferably $k \geq 1.25$.

Here a method for attaching mounted parts to a mounting substrate according to one of the above-described embodiments can include a method for rating this mounting attachment according to one of the above-described embodiments of the rating method. Here the rating can in particular be executed with the aid of a computer program according to one of the above-described embodiments.

BRIEF DESCRIPTION OF THE FIGURES

FIGS. 7-11 show different anchors, which can be used in the method according to embodiments of the invention.

DESCRIPTION OF THE PREFERRED EMBODIMENTS

Further advantages and features of the invention follow from the following description, in which the invention is described on the basis of an exemplary embodiment with reference to the enclosed drawings.

Figure 1:
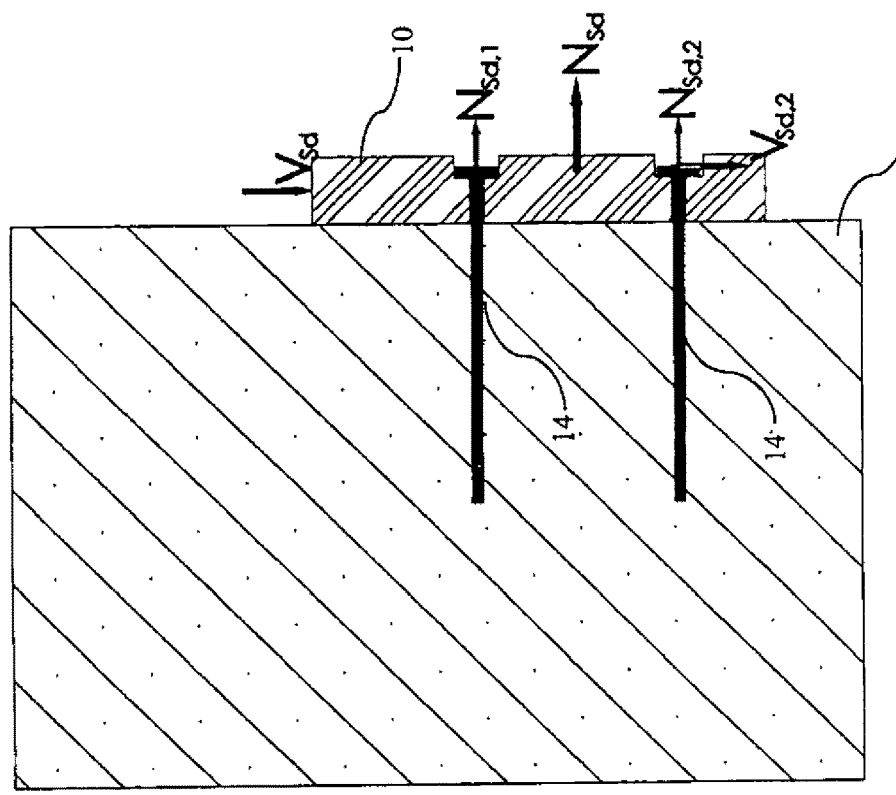
FIG. 1 shows a schematic cross-sectional view, which represents an attachment of a mounted part with the aid of two inclined anchors to concrete.

FIG. 1 shows a cross-sectional view of an attachment of a mounted part 10 to a mounting substrate 12 of concrete with the aid of two anchors 14, which are formed by means of schematically illustrated concrete screws in the embodiment as shown. In the exemplary embodiment of FIG. 1, the mounted part 10 is formed by a metal plate, as could be used, for example, to attach a balcony railing or the like. However, the invention is not limited to certain mounted parts. Rather, any mounted parts 10, in particular those of concrete, can be attached to the mounting substrate 12.

A transverse load with a rated value $V_{Sd}$ and a tensile load $N_{Sd}$, which are distributed evenly with respect to the corresponding loads $V_{Sd,1}$, $N_{Sd,1}$ with regard to the upper anchor and $V_{Sd,2}$, $N_{Sd,2}$ with regard to the lower anchor, acts on the mounted part 10, i.e. the following relations apply: $V_{Sd,1}=V_{Sd,2}=\frac{1}{2} V_{Sd}$, $N_{Sd,1}=N_{Sd,2}=\frac{1}{2} N_{Sd}$. The resultant or total load is inclined at an angle of arc tan $(V_{Sd}/N_{Sd})=40°$ to the surface normal.

In the exemplary embodiment of FIG. 1, the anchors 14 are not positioned normal to the surface of the mounting substrate 12, as is usual in the prior art. Instead they are positioned at an angle $\alpha_{anchor}$ of 30°, thus ¾ of the angle of the actual resultant load. A significantly higher load can thus be supported than in the case of a normal mounting. The effective installation depth hef is further illustrated in FIG. 1. The effective installation depth hef does not correspond to the length of the anchor 14 in this case, but to the normal projection of the latter, or, in other words, the length of the anchor 14 multiplied by $\cos(\alpha_{anchor})$.

Figure 2:
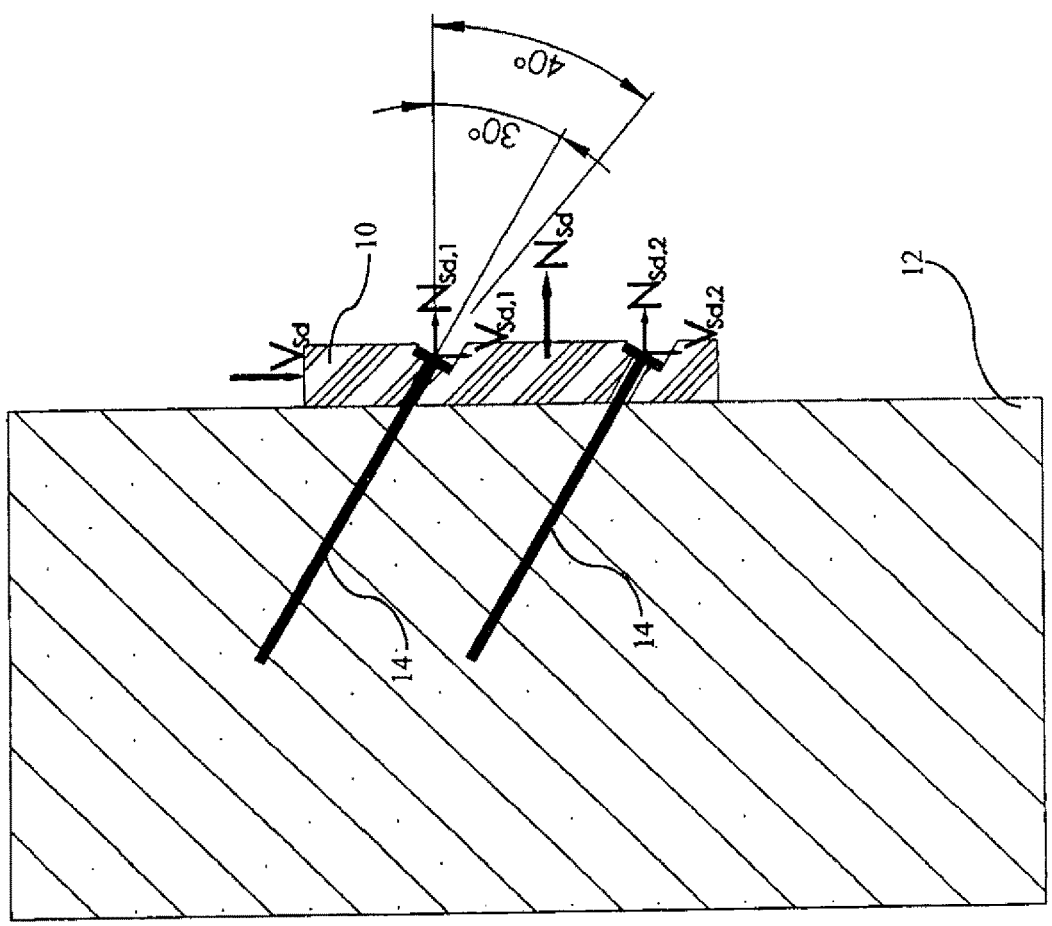
FIG. 2 shows a sectional view of an attachment of a mounted part in a region close to the edge of the concrete, comprising two normally positioned anchors.

FIG. 2 shows a cross-sectional view of an attachment of a mounting part 10 with the aid of two anchors 14 in a region of a mounting substrate 12 of concrete close to the edge. According to the valid rating regulations, the anchor close to the edge has to be designed in this case to support the entire transverse load according to the rated value of the transverse load $V_{Sd}$, i.e. applies: $V_{Sd,2}=V_{Sd}$. This is sometimes difficult to achieve in practice, because small edge distances decrease the characteristic resistance to transverse loading $V_{Rk}$.

Figure 3:
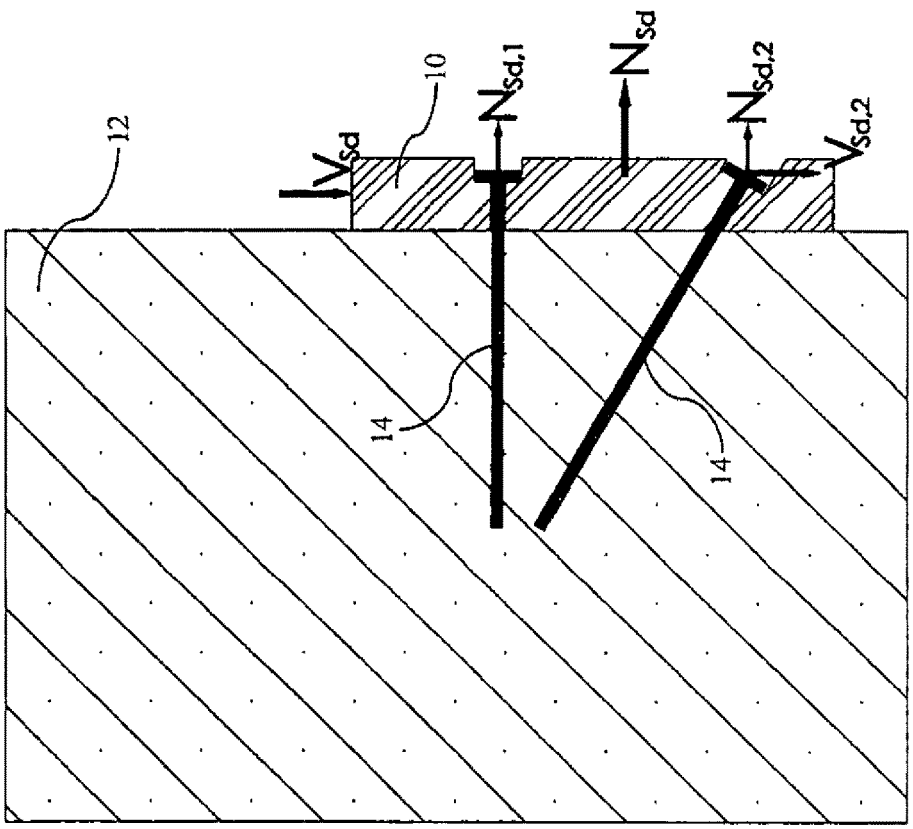
FIG. 3 shows the same situation as FIG. 2, wherein the anchor, which is closer to the edge, is positioned at an inclined angle with respect to the surface normal according to the invention.

A solution for these difficulties is shown in FIG. 3, where in the otherwise identical situation, the anchor close to the edge is positioned at an angle of $\alpha_{anchor}=\frac{3}{4}*\text{arc tan}(V_{Sd,2}/N_{Sd})$, but which has the same placement depth with regard to the surface of the mounting substrate 12, as the normally positioned anchor 14 of FIG. 2. Due to the fact that the anchor that is further away from the edge does not share a proportion of the transverse forces in the rating in this case, there is no reason not to position the said anchor normally in the usual way, as shown in FIG. 3.

Figure 4:
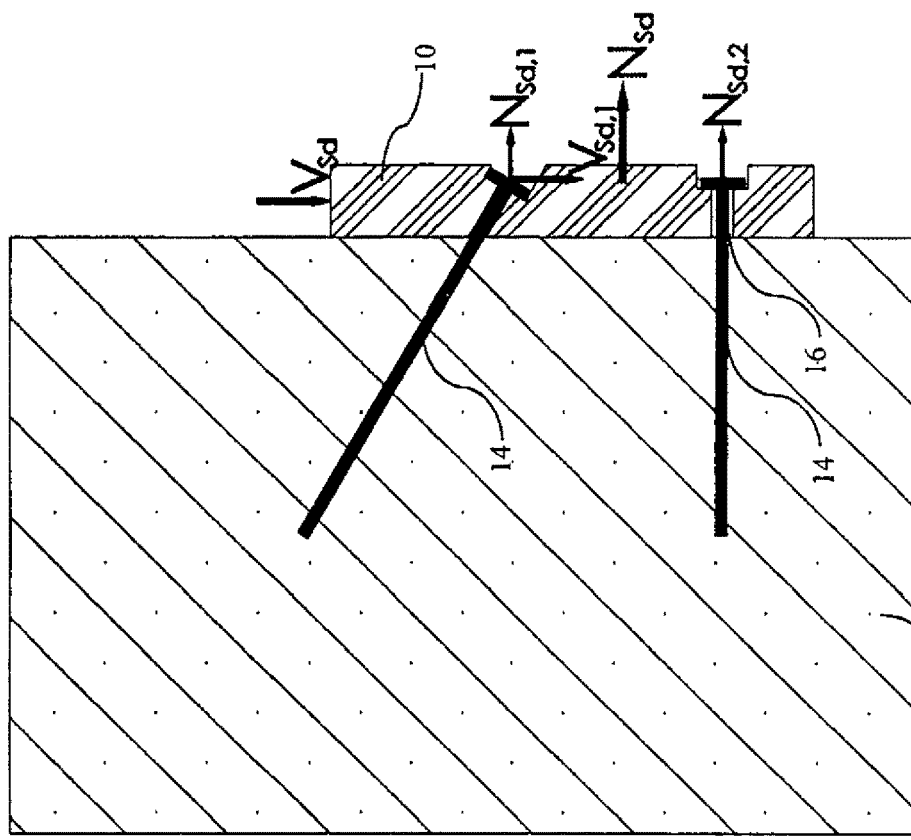
FIG. 4 shows the same situation as FIG. 2, wherein the anchor closer to the edge is arranged in an elongate hole in the mounted part and the anchor further away from the edge is positioned at an inclined angle to the surface normal.

FIG. 4 shows an alternative variant for solving the situation of FIG. 2. In this variant, the anchor 14 close to the edge is accommodated in an elongate hole 16, so that in the rating, this anchor does not share a proportion of the transverse load $V_{Sd}$, while the tensile loads are distributed evenly, i.e. $N_{Sd,2}=N_{Sd,2}=\frac{1}{2}*N_{Sd}$. The anchor 14 that is further away from the edge, which is positioned at an angle, has an improved load-bearing capacity with regard to this comparatively high transverse load $V_{Sd,1}=V_{Sd}$, as compared to a normally positioned anchor.

Figure 5:
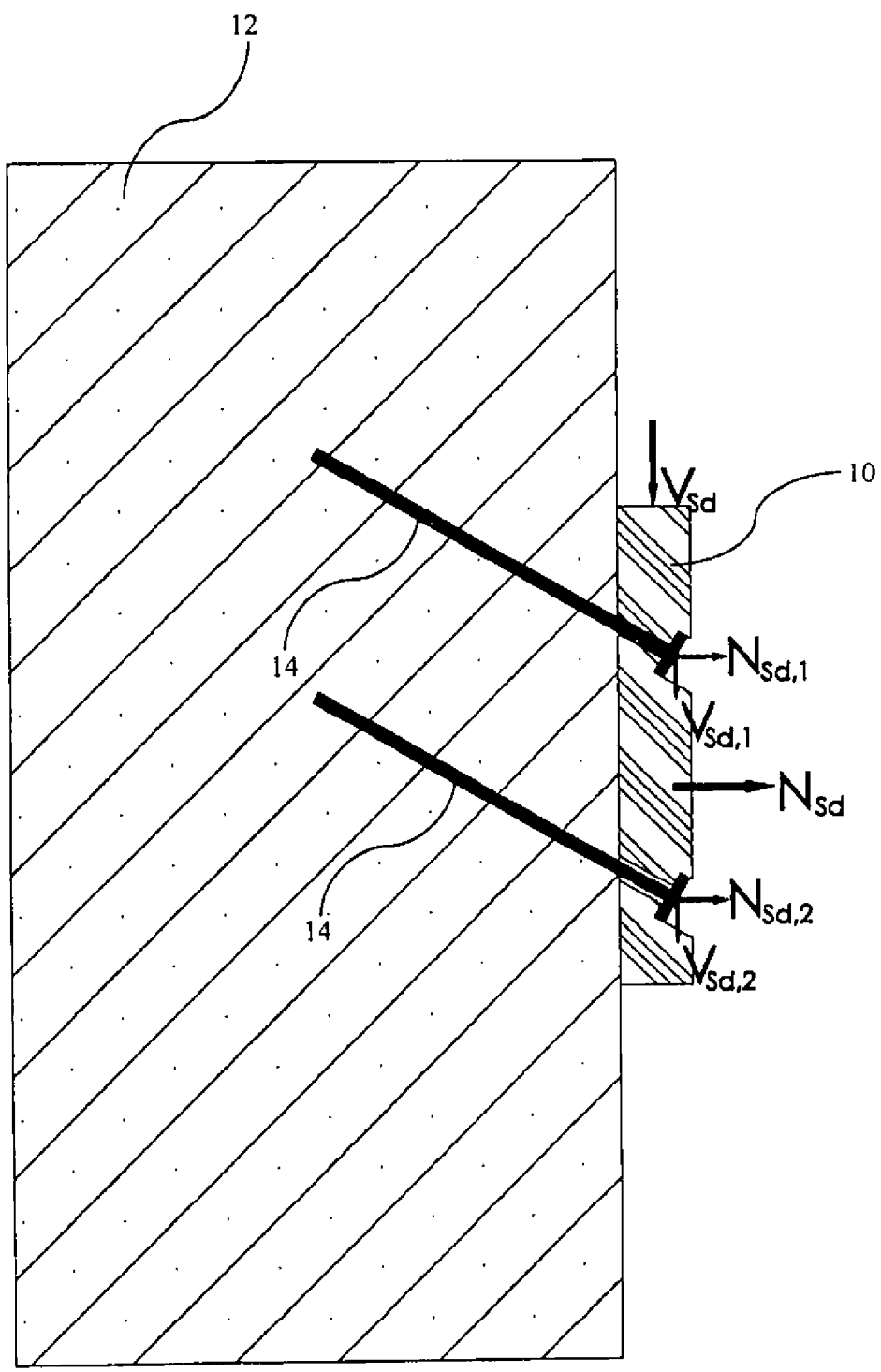
FIG. 5 shows an attachment of a mounted part with the aid of two inclined anchors, which receive a tensile load only.

Finally, FIG. 5 shows a variant, in which no pressure-resistant material is present between the mounted part 10 and the mounting substrate 12. A space is shown in FIG. 5, which, in practice, however, can be formed by a non-pressure-resistant material, such as, for example, an insulating material or a plaster, which is not pressure-resistant. In the arrangement of FIG. 5, the rated values of the transverse load $V_{Sd}$ or tensile load $N_{Sd}$, respectively, are distributed evenly to the individual anchors 14, i.e. the following applies: $V_{Sd,1}=V_{Sd,2}=\frac{1}{2}*V_{Sd}$, and $N_{Sd,1}=N_{Sd,2}=\frac{1}{2}*N_{Sd}$. $\alpha_{anchor}$ is selected in such a manner in this embodiment that it corresponds to arc tan $(V_{Sd}/N_{Sd})$, i.e. the anchors 14 are each arranged parallel to the resulting force and thus only receive a tensile load (with respect to their own longitudinal axis). In the general definition for the angle $\alpha_{anchor}$, this corresponds to the case k=1.33.

Figure 6:
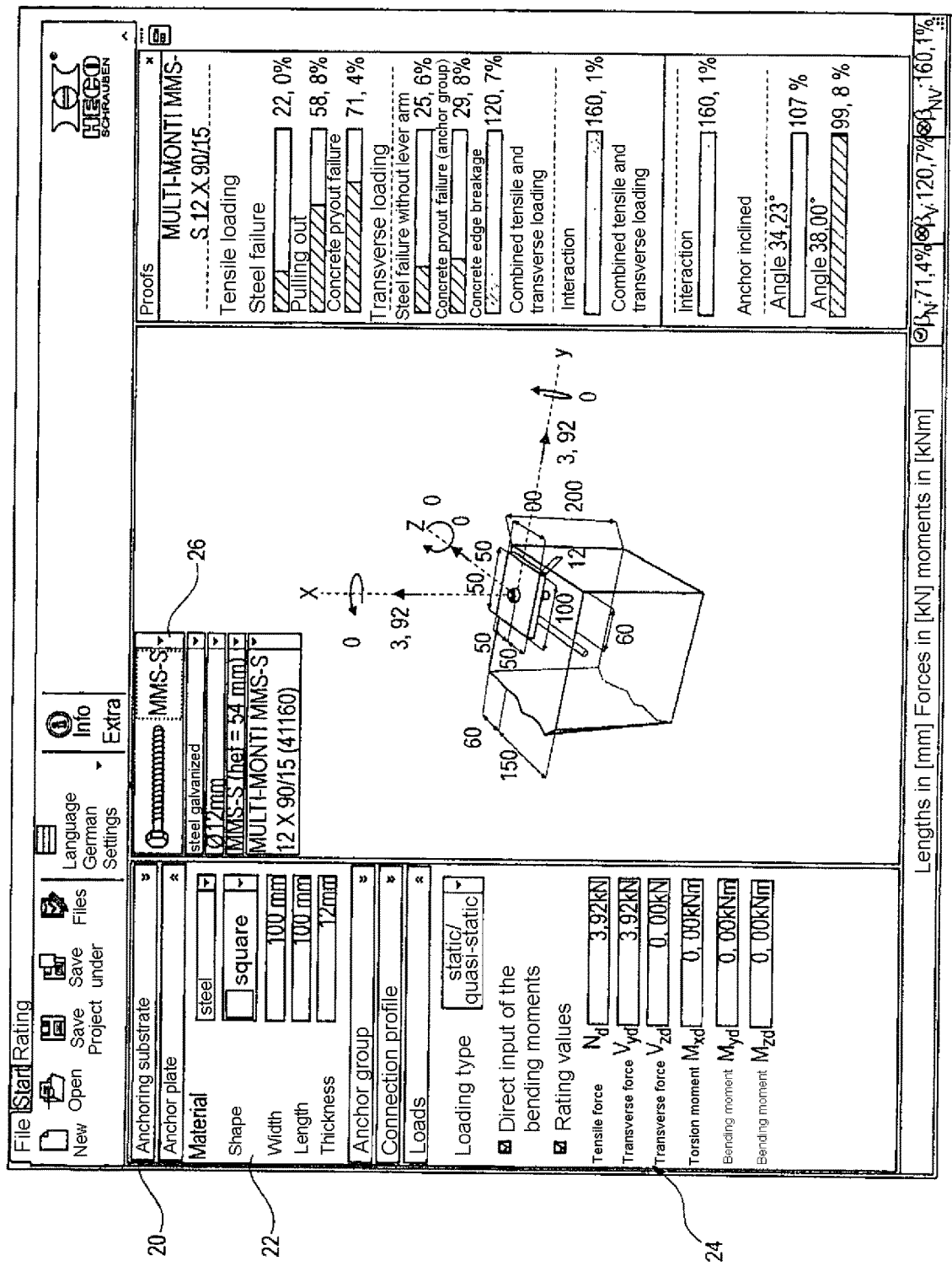
FIG. 6 shows a screenshot of a GUI of a computer program, which is suitable for carrying out ratings according to the method according to the invention.

A further aspect of the present invention relates to a computer program product, which includes a plurality of instructions, which, when executed on a computer system, output a GUI via a display device, as is shown in an exemplary manner in FIG. 6. Such computer programs are generally of known art and are in common use, and help the user to determine whether a planned application, in this case an attachment of a mounted part 10 to a mounting substrate 12 of concrete, corresponds to the rating regulations. For this purpose, the GUI includes input fields, which allow the user to input information with regard to a plurality of features, for example a field 20 for specifying the mounting substrate (in this case concrete), a field 22 for inputting information with regard to the type, size, shape and material of an anchor plate, fields 24 for inputting rated values of the loads, in particular tensile force, transverse force, torsion moment and bending moment, as well as a field 26 for specifying the type and the dimension of the anchor 14.

The results of the rating calculation corresponding to the input values and parameters are displayed on the right-hand side of the GUI of FIG. 6. As can be seen in the exemplary screenshot, the planned attachment satisfies the rating regulations with regard to all failure mechanisms, which are considered here, with regard to the tensile loading (steel failure, pull-out, concrete pryout failure). The rating regulations with regard to the transverse loading with regard to steel failure without a lever arm and with regard to concrete pryout failure are further also satisfied, but not the failure with regard to the concrete edge breakage. Here, the transverse loading exceeds the resistance to transverse loading with regard to the failure mechanism "concrete edge breakage" by approximately 20%, the interaction condition is even exceeded by 60%. These results refer to the rating in response to conventional mounting, in which the anchors 14 are positioned normal to the surface of the mounting substrate 12.

The computer program, however, can also propose ratings in which the anchor is not positioned normally, but at an angle $\alpha_{anchor}$ to the surface normal of the mounting substrate 12. In the embodiment as shown, the program automatically proposes a rating for an inclined mounting, when certain criteria are met. Such a criterion can be that the rating regulations cannot be satisfied with a normal mounting of the anchor. A further criterion can be that a significantly improved load-bearing capacity can be anticipated in the case of an inclined mounting, for example in cases in which a threshold with regard to the ratio $V_{Sd}/N_{Sd}$ is exceeded, or a threshold for $V_{Rk}/N_{Rk}$ is not reached. It is advantageous in some cases to consider a design that has a better load-bearing capacity, even if the rating regulations in the case of the planned mounting attachment are also satisfied with a normal mounting. This can prompt the user, for example, to consider a mounting with anchors of a smaller cross section. In some embodiments, the computer program itself can also propose the suitable, generally most cost-efficient anchors, by means of which the mounting attachment can be realized, by utilizing the possibility of an inclined mounting.

It can be seen in the screenshot shown in FIG. 6 that the rating regulation is not yet satisfied at an angle $\alpha_{anchor}$ of 34.23°, but that the load-hearing capacity is already significantly better than in the case of normal mounting. At an angle of 38°, in contrast, all rating regulations are satisfied.

It goes without saying that officially recognized rating regulations do not yet exist for a suitable mounting of anchors in concrete. When reference is thus made in connection with FIG. 6 to "rating regulations", this relates to the rating regulations, which are expanded to the possibility of an inclined mounting. The analyses by the inventor clearly suggest that significantly improved load-bearing capacities than currently exist can be created thereby in a plurality of applications.

In a simplified embodiment of the computer program, provision can be made for only one rating to be executed for a predetermined alternative standard mounting angle, for example a mounting angle of 45°. The rating can be executed upon request, i.e. in response to a user input, and/or can be executed automatically. An automatic execution can be considered, for example, when due to the mounting position (closeness to edge, lever arm, etc.) and due to the loads underlying the rating, in particular tensile forces and transverse forces, there are indications that the load-bearing capacity would be increased with a mounting at the alternative standard mounting angle as compared to the normal mounting. It is also possible for the rating calculation for the mounting to be executed as a matter of course at the alternative standard mounting angle and for the result to be displayed, or at least to be displayed if it promises an improved load-bearing capacity.

The above-described method is not limited to a specific type of anchor. In fact, the term "anchor" is to be understood broadly in the present disclosure, and it can be formed by a one-piece anchor in the strictest sense, as well as by two- or three-piece systems, which will be briefly described below.

In FIGS. 1 to 5 the anchors 14 each take the form of concrete screws. Such concrete screws are known in the prior art and typically have a self-cutting concrete thread, which forms a load introduction region, a shaft section, and a head, which serves as a power drive for positioning the anchor, as well as for securing the mounted part 10.

Figure 7:
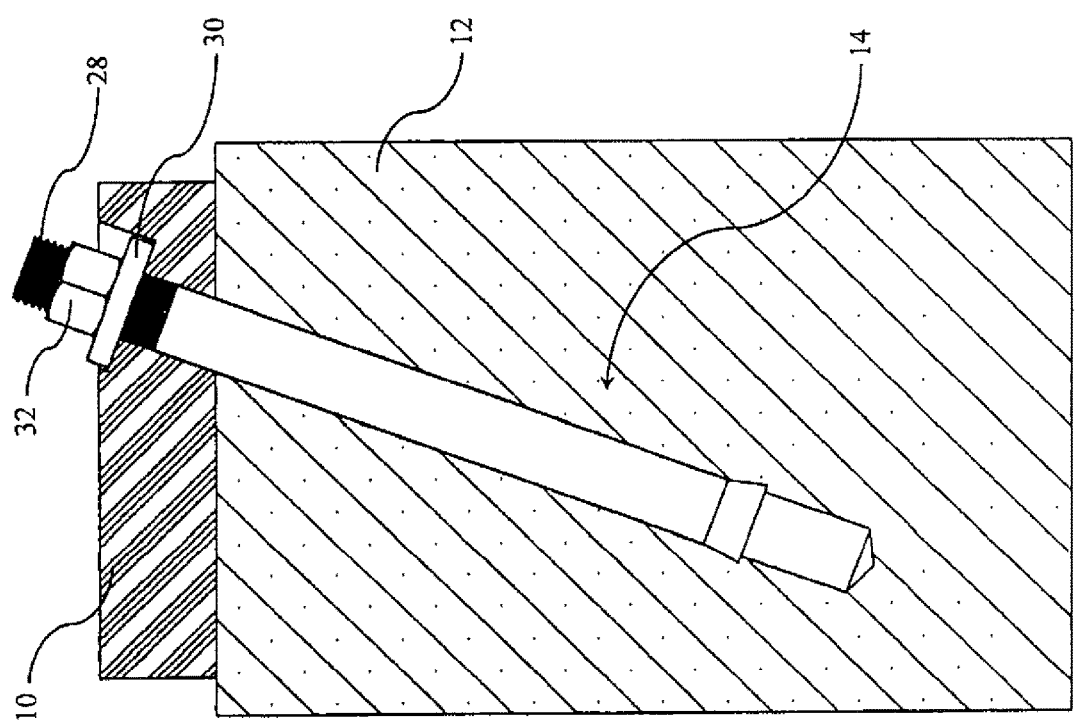

FIG. 7 shows a further example of a one-piece anchor, namely an undercut anchor, which is introduced into the mounting substrate 12 at an inclined angle. On its trailing end, the undercut anchor has a metric thread 28, to which a washer 30 is attached, and which is clamped against the mounted part 10 by means of a nut 32.

Figure 8:
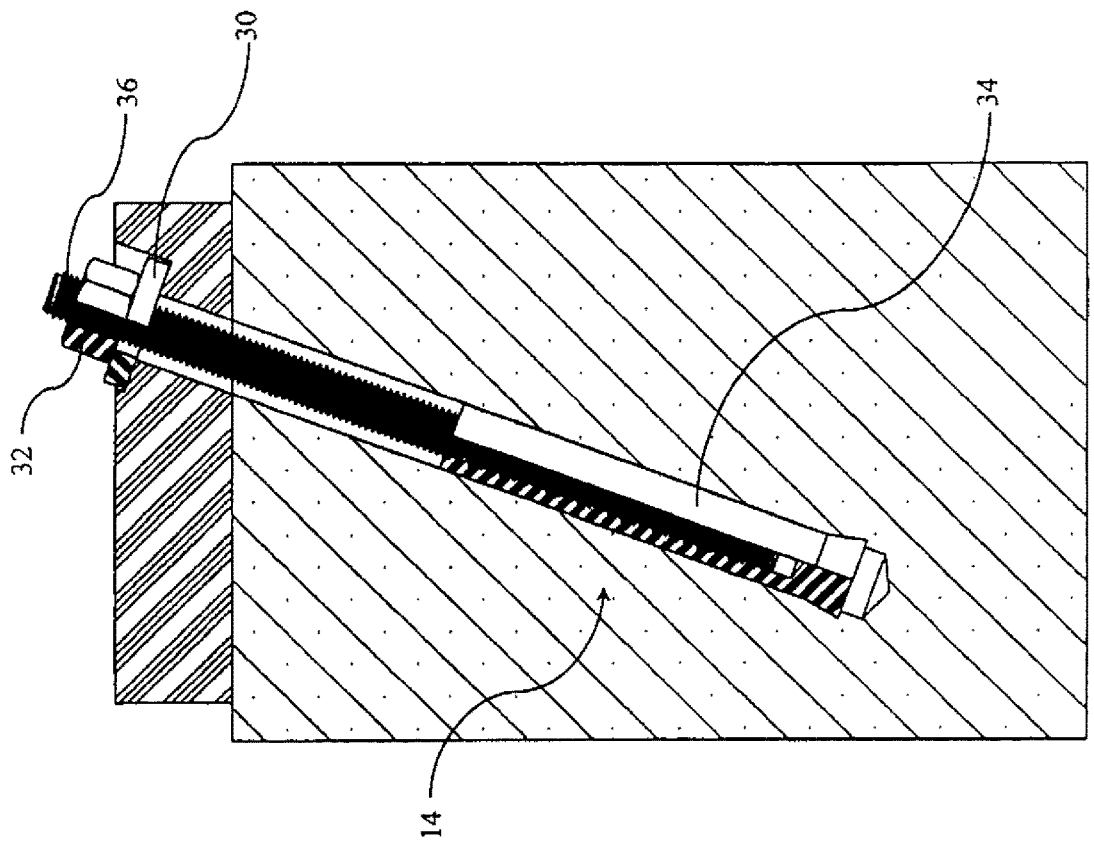

FIG. 8 shows a two-piece anchor, which comprises an anchor sleeve 34, which also provides an undercut. The anchor sleeve 34 is illustrated in FIG. 8 in a partially sectioned manner and has a metric internal thread, into which a threaded rod 36 is screwed. A washer 30 and nut 32 are again arranged on the trailing end of the threaded rod 36.

Figure 9:
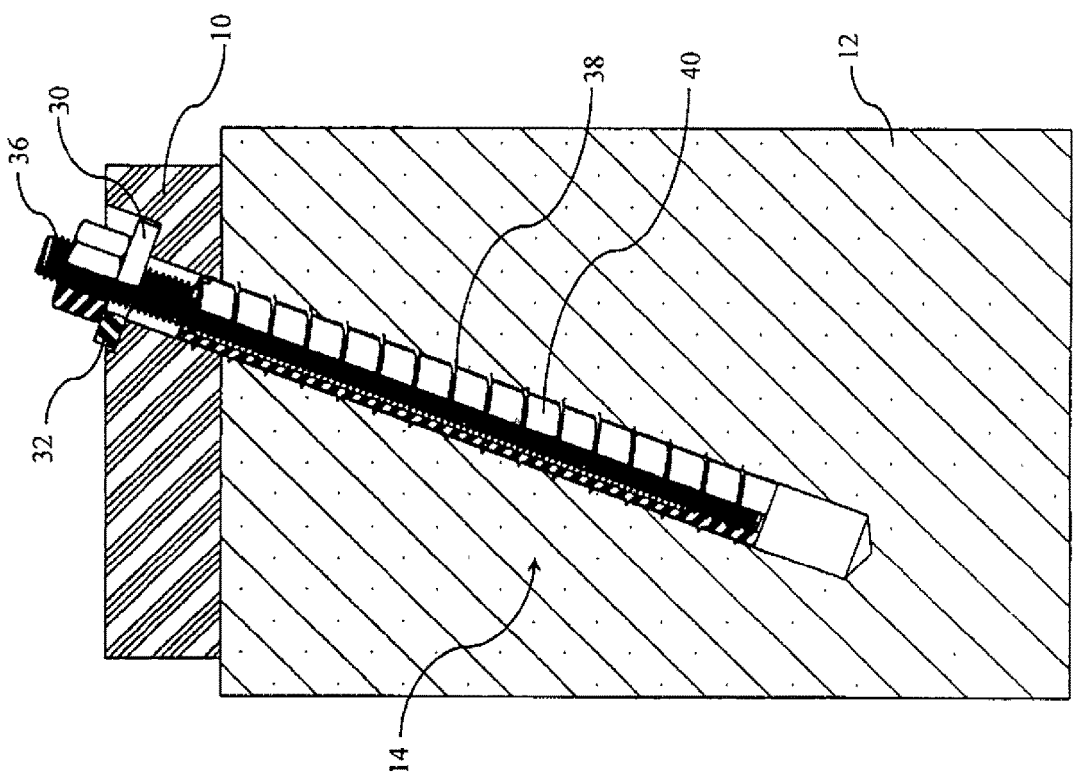

FIG. 9 shows a further example for a two-piece anchor, comprising an anchor sleeve 40 comprising a self-cutting external thread 38. Inside the anchor sleeve 40 a metric internal thread is again formed, into which a threaded rod 36 is screwed in a manner similar to FIG. 8. A washer 30 and a nut 32, which are clamped against the mounted part 10, again serve to attach the mounted part 10 to the mounting substrate 12. Here the threaded rod 36 represents an example of an above-cited "clamping element". The anchor sleeve 40 further has a power drive (not shown in the Figure), by means of which it can be screwed into the concrete of the mounting substrate 12.

Figure 10:
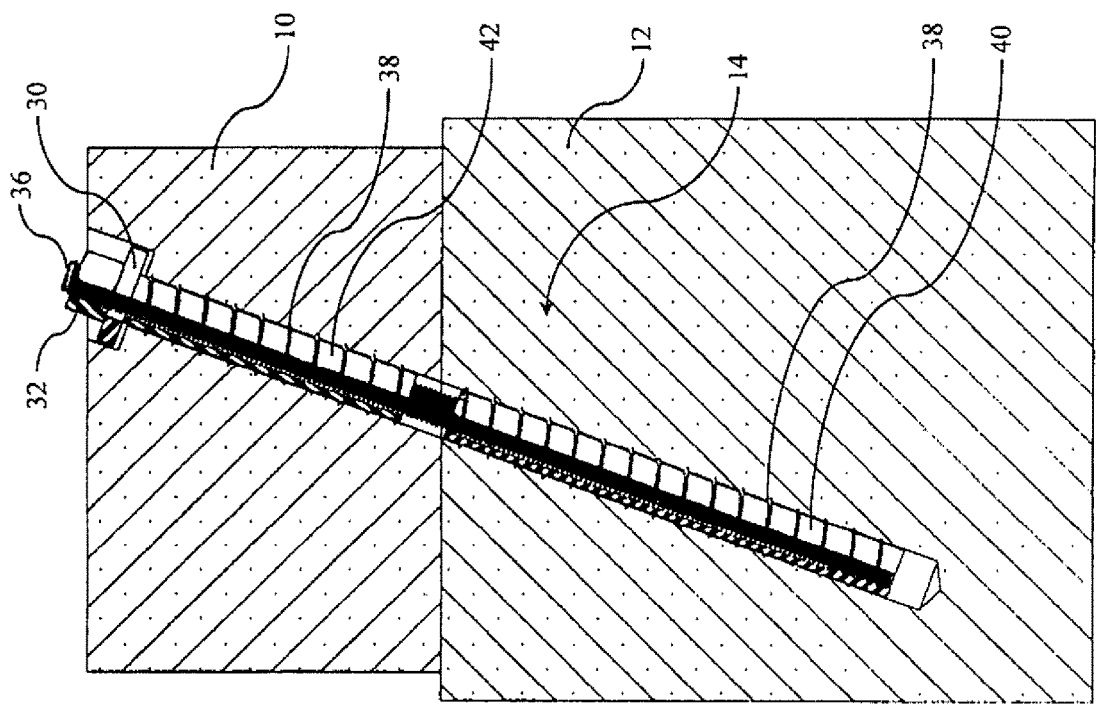

FIG. 10 shows an anchor 14 according to a related embodiment, which is formed by a three-piece system, which comprises a first threaded sleeve 40 of the above-described type, and has a second threaded sleeve 42, which does not include an internal thread. In the illustration of FIG. 10, the mounted part 10 is also a concrete part, which is joined to the mounting substrate 12 with the aid of the anchor 14. Bridge caps or the like are an example for such mounted parts of concrete.

As shown in FIG. 10, the first threaded sleeve 40 is screwed into the mounting substrate 12, while the second anchor sleeve 42 is screwed into the mounted part 10. A threaded rod 36, which is guided through the (internal thread-free) second anchor sleeve 42, and which is screwed into the internal thread in the first anchor sleeve 40, again serves as clamping element here. When the nut 32 is tightened, the first and the second anchor sleeve 40, 42 are axially clamped in such a manner that the first and the second anchor sleeve 40, 42 generate opposed bond stresses in the mounting substrate 12 or the mounted part 10, respectively.

FIG. 11 shows a side view and a cross-sectional view of an alternative two-piece system, which is essentially similar to the system of the anchor 14 of FIG. 9. The difference is that the anchor sleeve 40 does not have an internal thread in this case, and that the clamping element is formed by a screw 44 in this case, which is inserted upside down, i.e. head 46 first into the borehole, before the anchor sleeve 40 is screwed in. The head 46 is then located on the leading end of the clamping element 44 and forms a stop element, against which the anchor sleeve 40 can abut so as to transfer a load. This variant is advantageous in that the anchor sleeve 40 can be embodied without an internal thread. Such a clamping element 44, comprising a stop element 46 on the leading end, can also be used for a three-piece system, as shown in FIG. 10, wherein again the clamping element 44 is first introduced into the borehole, and the first and the second sleeve 40, 42 are then guided over the clamping element and are screwed into the mounting substrate 12 or the mounting part 10, respectively.

It is to be noted that all embodiments with a concrete thread, which introduce the load that is to be transferred into the concrete via a bonding mechanism, can likewise be embodied with a composite anchor, which transfers the load into the concrete via a composite mass. It is furthermore to be noted that the above-described embodiments are to be considered to be purely exemplary and as not limiting the invention, and that the described features can be significant in any combination.

LIST OF REFERENCE NUMERALS

10 mounted part
12 mounting substrate
14 anchor
16 elongate hole
20, 22, 24, 26 fields of the GUI
28 metric thread 30 washer
32 nut
34 anchor sleeve
36 threaded rod
38 external thread
40 first anchor sleeve
42 second anchor sleeve
44 screw
46 head

What is claimed is:

1. A method for attaching mounted parts to a mounting substrate, having a surface, which is formed of concrete or masonry, using a group of anchors having anchor heads, said method comprising:

determining a rated value for $V_{Sd}$ and $N_{Sd}$ of a transverse load and tensile load respectively for each anchor within said group and a corresponding ratio $V_{Sd}/N_{Sd}$, confirming that for each anchor within at least a subset of said anchors within said anchor group the corresponding ratio $V_{Sd}/N_{Sd}$ of the rated value of the transverse load $V_{Sd}$ and the rated value of the tensile load $N_{Sd}$ exceeds a value of 0.3 and that a ratio of the characteristic resistance to transverse loading $V_{Rk}$ and to tensile loading $N_{Rk}$ is less than 1.1, wherein each of the values $V_{Sd}$, $N_{Sd}$, $V_{Rk}$ and $N_{Rk}$ refer to an anchor when mounted perpendicular to the surface of the mounting substrate, mounting the anchors of said subset with their heads tilted in a direction of the corresponding rated value $V_{Sd}$ of the transverse load by a respective angle of inclination $\alpha_{anchor}$ to the normal to the surface of the mounting substrate, wherein:

$$\alpha_{anchor} = k * \tfrac{3}{4} * \arctan(V_{Sd}/N_{Sd}) \text{ for } N_{Sd} > 0, \text{ and}$$

$$\alpha_{anchor} = k * 67.5° \text{ for } N_{Sd} = 0,$$

where: $0.6 < k < 1.34$, provided that $\alpha_{anchor} \leq 75°$, and mounting further anchors of the group of anchors, if any perpendicular to the mounting substrate surface.

2. The method according to claim 1, where the following applies $0.6 < k < 1.2$.

3. The method according to claim 1, where the following applies $0.85 < k < 1.34$.

4. A method for attaching mounted parts to a mounting substrate which is formed of concrete or masonry having a surface, using a group of anchors having anchor heads, said method comprising:

determining a rated value $V_{Sd}$ and $N_{Sd}$ of a transverse load and tensile load respectively for each anchor within said group and a corresponding ratio $V_{Sd}/N_{Sd}$, confirming that for each anchor within at least a subset of anchors within said anchor group the corresponding ratio $V_{Sd}/N_{Sd}$ of the rated value of the transverse load $V_{Sd}$ and the rated value of the tensile load $N_{Sd}$ exceeds a value of 0.8, and that a ratio of the characteristic resistance to transverse loading $V_{Rk}$ and to tensile loading $N_{Rk}$ is less than 1.1, wherein each of the values $V_{Sd}$, $N_{Sd}$, $V_{Rk}$ and $N_{Rk}$ refer to an anchor when mounted perpendicular to the surface of the mounting substrate, mounting the anchors of said subset with their heads tilted in a direction of the corresponding rated value $V_{Sd}$ at a respective angle of inclination $\alpha_{anchor}$ of between 35° and 55° to the normal to the surface of the mounting substrate, and mounting further anchors of the group of anchors, if present, perpendicular to the mounting substrate surface.

5. The method according to claim 1, wherein the characteristic resistances to transverse loading $V_R k$ or to tensile loading $N_{Rk}$, respectively for said perpendicularly mounted anchor, satisfy the following relationship:

$V_{Rk}/N_{Rk}$ is less than or equal to 0.8.

6. The method according to claim 1, wherein at least one anchor of said subset is guided through a bore in the mounted part, wherein the diameter of the bore exceeds the diameter of the anchor by less than 22%, in a section in which it is accommodated in the bore in the mounted state.

7. The method according to claim 1, further including positioning of an anchor perpendicular to the surface of the mounting substrate and wherein said mounting substrate includes an edge and said anchors that are positioned at a respective angle of inclination to the normal to the surface of the mounting substrate are closer to said edge than said perpendicularly mounted anchor.

8. The method according to claim 1, wherein said mounting substrate includes an edge and said mounted part comprises an elongate hole, wherein said method further includes positioning of an anchor in said elongate hole and perpendicular to the surface of the mounting substrate, and wherein said method comprising mounting an anchor positioned at a respective angle to the normal of the mounting substrate in a position that is further away from said edge than said perpendicularly mounted anchor in the elongate hole.

9. The method according to claim 1, wherein a space is present between the mounted part and the mounting substrate, in which a material is located that is not pressure resistant, and for which the following applies: $1.2 < k < 1.34$.

10. The method according to claim 1, wherein said anchors positioned at a respective angle of inclination comprises a one-piece anchor having a leading end and trailing end, which comprises the following:

a load introduction region, which is arranged in the region of a leading end of the anchor, and which is suitable for introducing a load into the mounting substrate, a shaft section, a section or an element for securing the anchor to the mounted part in the region of a trailing end, and a power drive for positioning the anchor.

11. The method according to claim 1, wherein said anchors positioned at a respective angle of inclination comprises a two-piece system, which comprises an anchor sleeve and a clamping element, wherein the anchor sleeve is suitable for introducing a load into the mounting substrate and has an internal thread, and wherein the clamping element has a shaft section including a leading end and trailing end, which, in the region of its leading end, has an external thread, by means of which it can be screwed into the internal thread of the anchor sleeve in order to transfer a load, comprises a section or an element, for securing the shaft section of the clamping element to the mounted part in the region of a trailing end, and has a power drive for screwing the clamping element into the anchor sleeve.

12. The method according to claim 10, wherein said anchor heads comprise screw heads which form said power drive for screwing the clamping element into the anchor.

13. The method according to claim 1, wherein said anchors positioned at a respective angle of inclination comprises a two-piece system, which comprises an anchor sleeve and a clamping element, wherein the anchor sleeve is suitable for introducing a load into the mounting substrate, and wherein the clamping element has a shaft section including a leading end and trailing end, which, in the region of its leading end, has a stop element comprising a screw head or a screwed-on nut, against which the anchor sleeve can abut in order to transfer a load, and comprises a section or an element for securing the shaft section of the clamping element to the mounted part in the region of a trailing end.

14. The method according to claim 11, wherein a thread is provided on the trailing end of the anchor or of the clamping element, respectively, and the said element for securing the anchor or the clamping element, respectively, is formed by a nut, which can be screwed against the mounted part on the thread.

15. The method according to claim 1, wherein said anchors positioned at a respective angle of inclination comprises a multi-piece system, which comprises the following:
a first anchor sleeve, which is suitable for introducing a load into the mounting substrate,
a second anchor sleeve, which is suitable for introducing a load into the mounted part, and
an elongate clamping element, which is suitable for being guided through the second anchor sleeve and for being inserted into the first anchor sleeve, or for being guided through the latter, and which is suitable for axially clamping the first and the second anchor sleeve in such a manner that the first and the second anchor sleeve generate opposed composite bond stresses in the mounting substrate or mounted part, respectively.

16. The method of claim 1, wherein for the ratio $V_{Sd}/N_{Sd}$ of the rated value of the transverse load $V_{Sd}$ and the rated value of the tensile load $N_{Sd}$ of at least one anchor in the anchor group the following applies: $V_{Sd}/N_{Sd} > 0.6$.

17. The method of claim 16, wherein for the ratio $V_{Sd}/N_{Sd}$ of the rated value of the transverse load $V_{Sd}$ and the rated value of the tensile load $N_{Sd}$ of at least one anchor in the anchor group the following applies: $V_{Sd}/N_{Sd} > 1.0$.

18. The method according to claim 1, where the following applies: $0.8 < k < 1.34$.

19. The method according to claim 1, where the following applies: $0.6 < k < 1.15$.

20. A method for rating and carrying out an attachment of mounted parts to a mounting substrate, having a surface, which is formed of concrete or masonry, using a group of anchors, said method comprising:
(1) determining a rated value $V_{Sd}$ and $N_{Sd}$ of the transverse load and tensile load and a corresponding ratio $V_{Sd}/N_{Sd}$ respectively for each anchor within said group when mounted perpendicularly to the surface of said mounting substrate, confirming for each anchor within at least a subset of said anchors within said anchor group that the corresponding ratio $V_{Sd}/N_{Sd}$ of the rated value of the transverse load $V_{Sd}$ and the rated value of the tensile load $N_{Sd}$ exceeds a value of 0.3 and that the ratio of a characteristic resistance to transverse loading $V_{Rk}$ and to tensile loading $N_{Rk}$ is less than 1.1, wherein each of the values $V_{Sd}$, $N_{Sd}$, $V_{Rk}$ and $N_{Rk}$ refer to an anchor when mounted perpendicular to the surface of the mounting substrate, (2) determining for each anchor having a head within said subset as to whether the rated value of the loading exceeds the rated value of the resistances of this anchor with respect to at least one failure mechanism, provided that this anchor is positioned with its head tilted in a direction of the corresponding rated value $V_{Sd}$ at an angle of inclination $\alpha_{anchor}$ to the normal to the surface of the mounting substrate, wherein:

$$\alpha_{anchor} = k*^{3}\!/\!_{4}*\arctan(V_{Sd}/N_{Sd}) \text{ for } N_{Sd} > 0, \text{ and}$$

$$\alpha_{anchor} = k*67.5° \text{ for } N_{Sd} = 0,$$

where: $0.6 < k < 1.34$ and (3) if it is determined that said loading does not exceed the rated value of the resistances of this anchor with respect to said at least one failure mechanism, mounting said at least one anchor in the anchor group mounted at said angle of inclination $\alpha_{anchor}$.

21. The method according to claim 20, wherein the following applies $0.6 < k < 1.2$.

22. The method according to claim 20, wherein the following applies: $0.85 < k < 1.34$.

23. The method according to claim 20, wherein a characteristic resistance to transverse loading $V_{Rk}$ or to tensile loading $N_{Rk}$, respectively, for said perpendicularly mounted anchor satisfy the following relationship:

$V_{Rk}/N_{Rk}$ is less than or equal to 0.8.

24. The method according to claim 20, wherein the at least one anchor is guided through a bore in the mounted part, wherein the diameter of the bore exceeds the diameter of the anchor by less than 22% in a section in which it is accommodated in the bore in the mounted state.

25. The method according to claim 20, further including positioning of an anchor perpendicular to the surface of the mounting substrate and wherein said mounting substrate includes an edge and said anchors that are positioned at a respective angle of inclination to the normal to the surface of the mounting substrate are closer to said edge than said perpendicularly mounted anchor.

26. The method according to claim 20, wherein said mounting substrate includes an edge and said mounted part comprises an elongate hole, wherein said method further includes positioning of an anchor in said elongate hole and perpendicular to the surface of the mounting substrate, and wherein said method comprising mounting an anchor positioned at a respective angle to the normal of the mounting substrate in a position that is further away from said edge than said perpendicularly mounted anchor in the elongate hole.

27. The method according to claim 22, wherein a space is present between the mounted part and the mounting substrate, in which a material is located, which is not pressure-resistant, and for which the following applies: $1.1 < k < 1.34$.

28. A method for rating and carrying out an attachment of mounted parts to a mounting substrate, having a surface, using a group of anchors, said method comprising:
(1) determining a rated value $V_{Sd}$ and $N_{Sd}$ of the transverse load and tensile load respectively for each anchor within said group when mounted perpendicularly to the surface of said mounting substrate, confirming for each anchor within at least a subset of said anchors within said anchor group that the corresponding ratio $V_{Sd}/N_{Sd}$ of the rated value of the transverse load $V_{Sd}$ and the rated value of the tensile load $N_{Sd}$ exceeds a value of 0.8 and that the ratio of a characteristic resistance to transverse loading $V_{Rk}$ and to tensile loading $N_{Rk}$ is less than 1.1, wherein each of the values $V_{Sd}$, $N_{Sd}$, $V_{Rk}$ and $N_{Rk}$ refer to an anchor when mounted perpendicular to the surface of the mounting substrate, (2) determining for each anchor having a head within said subset as to whether the rated value of the loading exceeds the rated value of the resistances of this anchor with respect to at least one failure mechanism, provided that this anchor is positioned with its head tilted in the direction of the corresponding rated value $V_{Sd}$ at an angle of inclination $\alpha_{anchor}$ of between 35° and 55° to the normal to the surface of the mounting substrate, and (3) if it is determined that said loading does not exceed the rated value of the resistances of this anchor with respect to said at least one failure mechanism, mounting said at least one anchor in the anchor group mounted at said angle of inclination $\alpha_{anchor}$.

\* \* \* \* \*

UNITED STATES PATENT AND TRADEMARK OFFICE
CERTIFICATE OF CORRECTION

PATENT NO. : 11,306,496 B2
APPLICATION NO. : 16/472080
DATED : April 19, 2022
INVENTOR(S) : Ulrich Hettich It is certified that error appears in the above-identified patent and that said Letters Patent is hereby corrected as shown below:

In the Claims

In Column 18, Line 2, in Claim 5, delete "$V_R k$" and insert -- $V_{Rk}$ --, therefor.

In Column 18, Line 63, in Claim 12, delete "anchor" and insert -- anchor sleeve --, therefor.

Signed and Sealed this
Twenty-third Day of August, 2022

Katherine Kelly Vidal
*Director of the United States Patent and Trademark Office*